May 9, 1939.  L. LEITZ  2,157,547
PHOTOGRAPHIC CAMERA
Filed Aug. 3, 1935
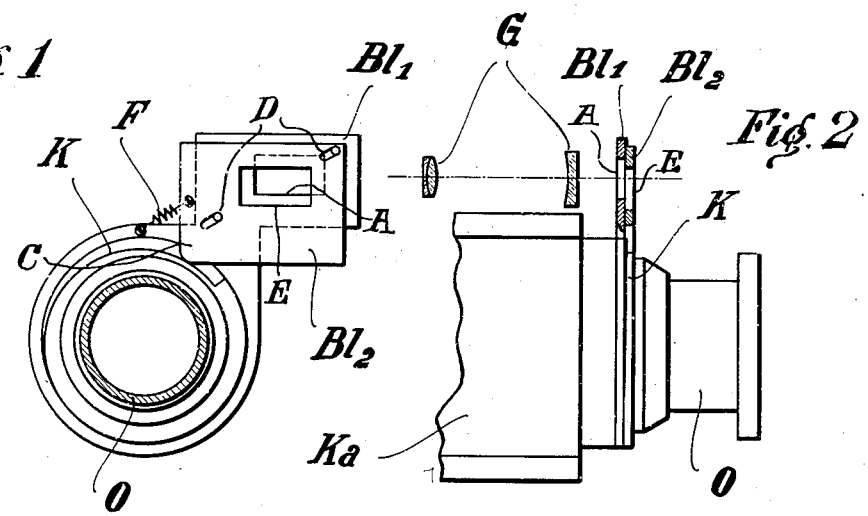
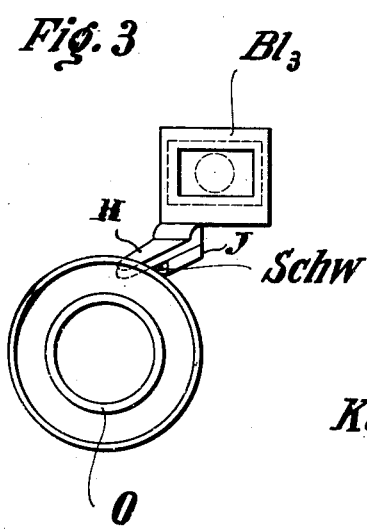
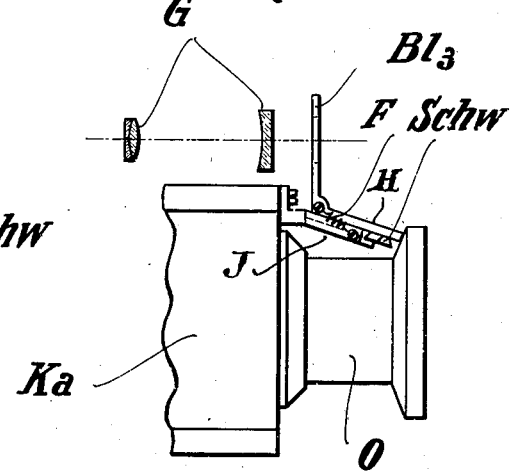
Ludwig Leitz
INVENTOR
BY Ivan E. C. Konigsberg
ATTORNEY Patented May 9, 1939

2,157,547

UNITED STATES PATENT OFFICE 2,157,547

PHOTOGRAPHIC CAMERA

Ludwig Leitz, Wetzlar, Germany, assignor to Ernst Leitz G. m. b. H., Wetzlar, Germany Application August 3, 1935, Serial No. 34,587
In Germany August 3, 1934

3 Claims. (Cl. 88—1.5)

The object of this invention is to provide an improved finder mechanism for photographic cameras for automatically correcting or compensating for errors in photography caused by parallax and by the difference in the field of view of the ordinary finder and that included within the angle of view of the objective of a camera.

As is known, parallax is the error in photography arising from the fact that the axis of the view finder does not coincide with the axis of the objective. The prior art has attempted to correct or compensate for parallax by providing a view finder with means for displacing its optical axis angularly. See for instance United States patent to Tessier No. 1,583,-706, May 4, 1926. Such prior disclosure provides however only for compensation for parallax and does not include compensation for the difference in views caused by variations in the angle of view of the objective. Hence, even though parallax be compensated for, either by the means disclosed in the said patent or by other known means, the other trouble or error referred to remains. It is therefore a further object of this invention to provide means for compensating for the difference between the fields or views of the finder and the objective.

As is known, the angle of view covered by the objective does not remain constant but decreases as the objective approaches the object. This decrease is very noticeable and disturbing when the objective is within a distance of less than one meter of the object. In this instance the reduction in the angle of view of the objective is caused by the greater distance between the objective and the photographic film which is required for such close work. At such small distances the eye sees in the finder a greater portion of the object than that which will be photographed by the objective. In order to correct this error or to compensate therefor it is necessary that an adjustable finder be used or the eye will see objects different from the objects which are within the angle of view of the objective and which are actually photographed. A fixed finder will not compensate for this error because a fixed finder usually is arranged to cover the same angle of view as that of the objective only when photographing at medium distances of from four to five meters. At lesser distances the fixed finder discloses a larger view than that which is actually included within the angle of view of the objective.

It has been found that it is possible to provide against the two errors mentioned above by means of a finder mechanism which displaces the field of view seen in the finder mask simultaneously with a movement for adjusting the opening in the finder mask in a predetermined manner with relation to the rotative movement of the objective in focusing the same. Or in other words, the said errors may be compensated for by a simple automatically operated finder mechanism which will in one operation compensate for the parallax effect between objective and finder and also adjust the finder mask so that the view in the finder will disclose only those objects which are within the angle of view of the objective.

Accordingly it is an object of the invention to provide a finder mechanism for varying the size of the field in the finder in proportion to and corresponding to the variations in the field of the objective under varying angles of view for objects at varying distances simultaneously with an automatic adjustment of the finder mechanism to compensate for parallax between finder and objective. This may be accomplished by a view finder having a masking or framing device in which two sides of the mask remain fixed while the two other sides are movable for the purposes of accomplishing the objects of the invention. Or in some cases a single movable mask may be used.

A further object is to provide such a mechanism to be operated by the objective and which is simple and inexpensive.

These and other objects will appear from a reading of the following specification with reference to the accompanying drawing in which—

Fig. 1 is a front view of the objective and the finder mechanism of a camera embodying the invention.

Fig. 2 is a side view of the camera with parts in section and parts removed.

Figs. 3 and 4 are similar views showing a modification in which a single mask is used.

Referring to Figures 1 and 2 the reference character $Ka$ designates a camera having an objective O focusable in the usual manner by rotation. G indicates diagrammatically the lens system of the view finder and $Bl_1$ designates a fixed mask suitably supported on the camera. In front of the fixed mask there is a movable mask $Bl_2$ which is operated by means of a curved cam K on the objective O. A spring F keeps the movable mask in operative relation with the cam. The arrangement is such that as the objective is rotated for focussing purposes, the movable mask is shifted relative to the fixed mask, the direction of movement being inclined at an angle of forty-five degrees. The movable mask has a cam contacting portion C and is guided by pin and slot connections D on the fixed mask as shown. Each of the two masks have a rectangular opening of the same size as shown. The openings are marked A and E respectively.

In operation, as the objective is being focused, the movable mask $Bl_2$ is moved diagonally in a plane adjacent to and parallel to the plane of the fixed mask $Bl_1$. The movement is inwardly and downwardly towards the optical axis of the objective. The extent of the movement is regulated and controlled by the cam K. The field of view seen through the finder is framed by the adjoining inner and lower edges of the fixed opening A and on the two other sides by the adjoining upper and outer edges of the movable opening E, the edges being designated with reference to the objective axis. The field of view in the finder was originally framed by the four edges of the coincidental openings. After focusing this field of view has been changed. The size of the framed opening has been decreased, that is the field of view has been decreased. The angle of the view along the inner and lower edges remain unchanged. The angle of view along the upper and outer edges has been changed. The calculations of the cam K and the arrangement is such that the field of view in the finder has been decreased to the same extent or in proportion as the angle of view of the objective has been decreased in focusing upon closer objects. The optical axis of the view finder remains parallel to the optical axis of the objective but it no longer intersects the field of view in the center thereof. It now intersects the field of view at another point which is higher than the center and laterally spaced therefrom.

The cam K is so calculated that the center of the field of view seen through the adjusted finder coincides at all times with the center of the field of view of the objective and the edges of the two fields of view also always coincide. Consequently the reduction in the size of the field of view in the finder has compensated for the angular reduction of the field in the objective and the displacement of the view with respect to the optical axis of the finder has compensated for parallax.

Figures 3 and 4 illustrate an arrangement in which only a single mask or frame $Bl_3$ is used. The single frame is carried by an arm H which is movable on a base J by means of a tongue and groove connection Schw. A spring F tends to keep the frame in contact with the objective O. The arm and base are downwardly inclined with respect to the optical axis of the finder G. It appears clearly from the drawing that when the objective is focussed in Figure 4, the frame $Bl_3$ is moved axially of the objective axis and that the field of view of the finder is displaced in parallelism by the opening in the frame. Thus the same result is accomplished in Figures 3 and 4 as that accomplished by the construction in Figures 1 and 2.

It will be observed that when the mask $Bl_3$ is moved diagonally across the view finder compensation for parallax is obtained in the same manner as explained under Figs. 1 and 2. Compensation for the decrease in the angular view of the objective result because the mask $Bl_3$ is also moved further away from the optical system of the finder. It follows from simple optical laws that as the object distance increases, the ratio of reduction in the formation of the image also increases, that is the view in the finder becomes smaller in the exact ratio to the same reduction in the angular view of the objective. Thus the angular decrease and parallax is compensated for also with the device shown in Figs. 3 and 4.

It will be obvious to those skilled in the art that this invention relates only to visual view finders. If a view finder is equipped with a ground glass and the finder lens has the same focal length as the objective, it is unnecessary to provide special means to compensate for the decrease in the field of view caused by the decrease in the angle of view covered by the objective when photographing at a distance less than one meter from the object. It is apparent that numerous variations are possible, and I contemplate as within the scope of my invention all such modifications and equivalents as fall within the appended claims.

I claim:

1. In a photographic camera having an objective and a visual view finder including a lens system and a fixed mask and a movable mask, means for movably supporting the movable mask upon the fixed mask, each of said masks having a rectangular opening of the same size and cooperating means on the objective and the movable mask for automatically displacing the opening in the latter with respect to the opening in the fixed mask in a downward direction toward the optical axis of the objective when the objective is focused upon close objects whereby to decrease the field of view in the view finder proportionally to a decrease in the angular field of view of the objective when the latter is focused and simultaneously therewith to compensate for parallax.

2. In a photographic camera having an objective and a visual view finder including a lens system and a fixed mask and a movable mask in front of said system, means for movably supporting the movable mask upon the fixed mask, each of said masks having a rectangular opening of the same size, a cam rotatable with the objective when the latter is focused and a spring for keeping the movable mask in contact with the said cam for automatically displacing the opening in the movable mask with respect to the opening in the fixed mask when the objective is focused upon close objects whereby to decrease the field of view in the view finder proportionally to a decrease in the angular field of view of the objective when the latter is focused and simultaneously therewith to compensate for parallax.

3. In a photographic camera having an objective and a visual view finder with a fixed optical axis, the view finder including a lens system and a fixed mask and a movable mask in front of the system, each of said masks having a rectangular opening of the same size, means for movably supporting the movable mask upon the fixed mask, a member actuated by the objective for automatically moving the movable mask in a direction towards the optical axis of the objective to displace the movable opening with respect to the fixed opening, and means for maintaining cooperative relations between the said member and the movable mask whereby to decrease the field of view in the view finder proportionally to a decrease in the angular field of view of the objective when the latter is focused and simultaneously therewith to compensate for parallax.

LUDWIG LEITZ.